Sept. 6, 1938.　　　D. C. HOFFMANN　　　2,129,528
CONTROL SYSTEM
Filed June 25, 1936
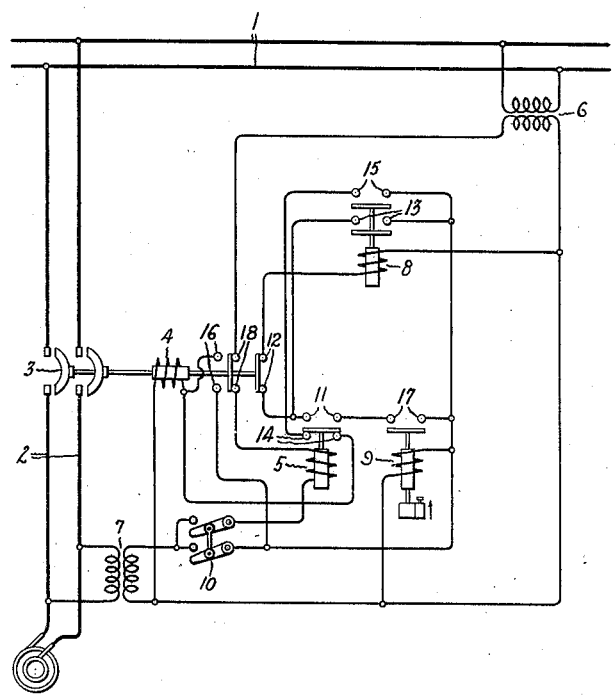
Inventor:
Daniel C. Hoffmann,
by Harry E. Dunham
His Attorney.

Patented Sept. 6, 1938

2,129,528

UNITED STATES PATENT OFFICE 2,129,528

CONTROL SYSTEM

Daniel C. Hoffmann, Philadelphia, Pa., assignor to General Electric Company, a corporation of New York Application June 25, 1936, Serial No. 87,208

2 Claims. (Cl. 171—118)

My invention relates to control systems and particularly to systems for controlling the closing of a circuit breaker between two alternating current circuits, and one object of my invention is to provide a simple, inexpensive arrangement of apparatus for interconnecting two alternating current circuits when they are approximately in synchronism.

My invention will be better understood from the following description when taken in connection with the accompanying drawing, the single figure of which diagrammatically illustrates an arrangement embodying my invention for closing a circuit breaker between two single phase circuits, and its scope will be pointed out in the appended claims.

Referring to the drawing, 1 and 2 represent independently energized alternating current circuits which are arranged to be connected together by a circuit breaker 3 which is provided with a closing and holding coil 4. In accordance with my invention, I provide a relay 5 which is connected to the two circuits 1 and 2 in any suitable manner so that it is energized in response to the difference between the voltages of the two circuits. As shown in the drawing, the winding of the relay 5 is connected in series with the opposed secondary windings of the potential transformers 6 and 7 by means of the auxiliary contacts 18 on the circuit breaker 3 and contacts of a manually controlled switch 10. The primary windings of the transformers 6 and 7 are respectively connected to the circuits 1 and 2. The winding of the relay 5 therefore has impressed upon it a voltage which varies between zero and twice the voltage of one of the circuits when the voltages of the two circuits are the same. When the voltage impressed upon the winding of the relay 5 exceeds a predetermined value, the relay 5 is arranged to complete an energizing circuit for a relay 8 which, when energized, completes a holding circuit for itself so that it remains in its energized position when the difference between the voltages subsequently decreases below the drop-out value of the relay 5. The relays 5 and 8 are arranged to complete an energizing circuit for the closing coil 4 of the circuit breaker 3 when the relay 8 is in its energized position and the relay 5 is at the same time in its deenergized position. Also, in order to prevent the circuit breaker 3 from being closed until the voltage of the circuit 2 has reached a predetermined value, a suitable time relay 9 is provided, which also has its contacts in the energizing circuit of the relay 8. This time delay is necessary in some cases where one of the circuits such as circuit 2 is supplied by a generator which is to be connected automatically as soon as possible to the other circuit. In such cases, it is desired that the generator reach normal speed before being connected to the other circuit. Hence relay 9 is provided if, during the starting of the generator, its voltage will build up before the generator speed becomes normal. Relay 9 is not required if generator voltage will not build up to normal until after the speed has become normal.

The operation of the arrangement shown in the drawing is as follows: When it is desired to close the circuit breaker 3, the manually controlled switch 10 is closed to complete across the secondary winding of transformer 7, circuits through the windings of relays 5 and 9. After being energized for a predetermined time, the relay 9 closes its contacts 17, which are in the circuit of the auxiliary relay 8. Also, when the difference between the voltages of the circuits 1 and 2 exceeds a predetermined value, the relay 5 closes its contacts 11 in the energizing circuit of the relay 8. When both of the contacts 17 and 11 are simultaneously closed, an energizing circuit is completed through the auxiliary contacts 12 of the circuit breaker 3 for the relay 8, which in turn, by closing its contacts 13, completes a locking circuit for itself. When the difference between the voltages of circuits 1 and 2 subsequently decreases below the drop-out value of the relay 5 so that it closes its contacts 14, a circuit is completed through these contacts 14 and the contacts 15 of the relay 8 for the closing coil 4. By closing its main contacts, the circuit breaker 3 connects the circuits 1 and 2 together, and by closing its auxiliary contacts 16, it completes a locking circuit for the closing coil 4 which is independent of the contacts 15 of the relay 8. Relays 8 and 5 become deenergized as soon as the circuit breaker 3 opens its auxiliary contacts 12 and 18 respectively.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, two alternating current circuits, a circuit breaker for interconnecting said circuits, a relay, a winding for said relay, means for applying to said winding a voltage proportional to the difference between the magnitudes of the voltages of said circuits when said circuit breaker is open, a second relay, a winding for said second relay, means controlled by said first-mentioned relay for effecting the energization of said winding for said second relay when the difference between the voltages of said circuits exceeds a predetermined amount, electromagnetic means for maintaining said second relay in its energized position after the winding therefor is energized, and means jointly controlled by said second relay when in its energized position and said first-mentioned relay when in its de-energized position due to the voltage difference between said circuits being below a predetermined value for effecting the closing of said circuit breaker.

2. In combination, two alternating current circuits, a circuit breaker for interconnecting said circuits, a relay, a winding for said relay, means for applying to said winding a voltage proportional to the difference between the magnitudes of the voltages of said circuits when said circuit breaker is open, a second relay, a winding for said second relay, means controlled by said first-mentioned relay for effecting the energization of said winding for said second relay when the difference between the voltages of said circuits exceeds a predetermined amount, means responsive to the energization of said second relay winding for maintaining said second relay winding energized independently of the difference between the voltages of said circuits, and means jointly controlled by said second relay when in its energized position and said first-mentioned relay when in its de-energized position due to the voltage difference between said circuits being below a predetermined value for effecting the closing of said circuit breaker.

DANIEL C. HOFFMANN.